United States Patent [19]

Welter

[11] Patent Number: 4,962,803
[45] Date of Patent: Oct. 16, 1990

[54] PNEUMATIC TIRE INCLUDING A BARRIER PLY

[75] Inventor: Thomas N. H. Welter, Keispelt, Luxembourg

[73] Assignee: The Goodyear Tire & Rubber Company, Akron, Ohio

[21] Appl. No.: 746,620

[22] Filed: Jun. 20, 1985

[30] Foreign Application Priority Data

Aug. 21, 1984 [EP] European Pat. Off. ........ 84630118.2

[51] Int. Cl.$^5$ .............................................. B60C 9/13
[52] U.S. Cl. ..................................... 152/541; 152/510; 152/548; 152/557
[58] Field of Search ............... 152/548, 549, 555, 558, 152/560, 450, 526, 539, 510, 541

[56] References Cited

U.S. PATENT DOCUMENTS

| | | | |
|---|---|---|---|
| 3,165,138 | 1/1965 | Manchetti et al. | 152/510 |
| 3,442,315 | 5/1969 | Mirtain . | |
| 4,258,773 | 3/1981 | de Saint-Michel | 192/454 |
| 4,319,621 | 3/1982 | Motomura et al. | 152/541 X |
| 4,445,560 | 5/1984 | Musy | 152/525 X |
| 4,510,984 | 4/1985 | Kishida et al. | 152/541 |
| 4,541,467 | 9/1985 | Nakamura | 152/548 |

FOREIGN PATENT DOCUMENTS

| | | |
|---|---|---|
| 2000346 | 9/1970 | Fed. Rep. of Germany . |
| 2215985 | 10/1973 | Fed. Rep. of Germany . |
| 2345936 | 4/1975 | Fed. Rep. of Germany . |
| 3141393 | 4/1983 | Fed. Rep. of Germany . |
| 1073993 | 9/1954 | France . |
| 1367293 | 12/1964 | France . |
| 1522420 | 4/1968 | France . |
| 2380907 | 9/1978 | France . |
| 2419179 | 10/1979 | France . |
| 1596694 | 8/1981 | United Kingdom . |

Primary Examiner—Michael W. Ball
Attorney, Agent, or Firm—Robert W. Brown

[57] ABSTRACT

A pneumatic tire (10) comprising a pair of annular beads (12,12') spaced from one another with a liner (20) extending between the tire beads. A reinforcement ply (24) and a barrier ply (26) are provided extending between the beads and a circumferentially inextensible belt assembly (28) is positioned in the crown region (30) of the tire. The reinforcement ply has parallel cords (27) of aromatic polyamide material or cables of steel and the barrier ply is made from a material having a ply modulus of elasticity substantially less than that of the reinforcement ply. The parallel cords or cables of the barruier ply preferably are at an angle ($a$) different than the angle ($\beta$) of the parallel cords or cables of the reinforcement ply.

5 Claims, 2 Drawing Sheets

PNEUMATIC TIRE INCLUDING A BARRIER PLY

BACKGROUND

The present invention relates generally to pneumatic tires, more specifically to radial ply pneumatic tires, and still more specifically to radial ply pneumatic aircraft tires.

The operating conditions for tires on the European Air Bus may be considered as an example of what aircraft tires must endure The main wheels on the aircraft support around 18,000 kilograms each at the aircraft's take-off weight, or about four times the maximum load of a truck tire of comparable size. During take-off the air bus attains a speed of about 350 kilometers per hour. As the air bus lifts off the ground, the main tires are spinning at about 1,600 revolutions per minute, and the nose-wheel tires are spinning at about 1,900 revolutions per minute. Upon landing the air bus makes contact with the runway at speeds of about 240 kilometers per hour and the rotational velocity of the tires rapidly increases from zero to about 1,100 revolutions per minute. During this process, the tire-surface speed is much less than the aircraft speed, resulting in substantial abrasion of the tire tread and heat generation within the tire. Also, reverse thrust of the engines during landing can increase the aircraft nose-wheel loading by up to 100 percent.

The Air Bus operating conditions for tires are severe, but those under which military aircraft tires must operate are even more demanding. For example, a French military aircraft known as a Mirage has tires on its main wheels that are comparable in size to the tires specified for a large automobile. However, on a Mirage the main tires support a static load of about 7,200 kilograms each. At take-off the smaller nose-wheel tires are spinning at about 5,400 revolutions per minute.

While this invention is particularly directed to the solution of problems that are most severe in aircraft tire applications, it is applicable in general to other pneumatic tires either which are of radial ply construction or which employ one or more reinforcement plies having parallel cords or cables of the same or nearly the same orientation. Typically such tires are of radial construction, which means that the parallel cords or cables form an angle between about 70° and 90° with respect to the mid-circumferential plane of the tire. In most radial ply tires, the angle of the cords or cables in each bead-to-bead reinforcement ply is in the range from 80° to 90° with respect to the mid-circumferential plane, and usually is near 90°.

Pneumatic tires having radial reinforcement plies as mentioned above most frequently have only one or two reinforcement plies extending between the tire beads. In many cases, a single reinforcement ply is used and it has parallel cords or cables at an angle of 90° with respect to the mid-circumferential plane of the tire. Under severe loading, such as occurs with aircraft tires, the parallel cords or cables in the shoulder regions of the tire tend to spread apart during deflection of the tire casing. Even if more than one radial ply is used, there is a tendency for the cords or cables to separate under loading and this weakens the tire in the regions between the cords or cables.

It is not unusual in pneumatic tires to place a "chipper" in the bead region of the tire to provide additional stiffness to its lower sidewall portion. The chipper is a reinforcement that typically extends from the mid-sidewall region to a region near the bead (around which it may be wrapped) and is located on the outer side of the bead. In some cases, a plurality of chippers are used to provide a stiffness variation desired in the lower sidewall or bead area of a particular tire.

The liner of a pneumatic tire is an impermeable elastomeric material positioned inside the tire to prevent air loss. Butyl and other materials typically used as liners have had the characteristic of extruding into regions between the parallel cords or cables in the carcass reinforcement ply or plies, particularly those of radial ply tires. This condition is aggravated where only a single main carcass reinforcement ply is used. A known method for preventing the extrusion of the liner material into the region between the parallel cords or cables of a carcass reinforcement ply is to add to the liner a second elastomeric "barrier" ply extending between the beads of the tire. This barrier elastomeric ply may be precured, either in whole or on one of its surfaces only, to prevent the liner material from being extruded into the region between the cords or cables of the reinforcement ply. Alternatively, a separate reinforcement material can be utilized as is illustrated in U.S. Pat. No. 3,165,138 issued Jan. 12, 1965 to J G Manchetti and H B Hindin. In the patent to Manchetti and Hindin, there is described a radial tire having a casing with a single full reinforcement ply extending from bead-to-bead. A barrier material is positioned in the casing to prevent the liner from extruding into the region between the radial cords or cables of the carcass. The barrier material is shown having a bias-cut fabric material that has a free end, an end which is unanchored, to permit the fabric material to remain free during shaping of the tire.

Other patents of interest with respect to the present invention include U.S. Pat. No. 4,445,560, issued May 1, 1984 to Jacques Musy, and U.S. Pat. No. 4,258,773, issued Mar. 31, 1981 to Michele R. Saint-Michel. These patents are directed to radial carcass aircraft tires having one or more radial plies extending from bead-to-bead and having a belt assembly positioned in the crown region of the tires to provide circumferential reinforcement.

SUMMARY OF THE INVENTION

The pneumatic tire of the invention comprises a pair of annular beads spaced from one another along the axis of the tire. A liner extends between the tire beads and functions to limit egress of inflation gases through the tire casing during inflated use of the tire. A reinforcement ply is positioned on the outer side of the liner and includes parallel cords made from an aromatic polyamide material or parallel cables made from steel wire. The cords or cables are embedded in an elastomeric material and extend between the beads. The reinforcement ply has a plurality of cord or cable ends per centimeter and has a ply modulus of elasticity as defined in the detailed description that follows. The pneumatic tire has no other bead-to-bead ply of parallel cords or cables having a substantially greater ply modulus of elasticity.

A barrier ply is included in the pneumatic tire. The barrier ply includes parallel cords or cables embedded in an elastomeric material and extending between the beads of the tire. The barrier ply is positioned between the liner and the reinforcement ply to form a barrier between them. The barrier ply has a plurality of cord or cable ends per centimeter and has a ply modulus of elasticity that is substantially less than the ply modulus of elasticity of the reinforcement ply.

In addition to the components mentioned above, a circumferentially inextensible belt assembly is positioned in the crown region of the tire.

The invention may be better understood by reference to the detailed description which follows and to the drawings.

DETAILED DESCRIPTION

Figure 1:
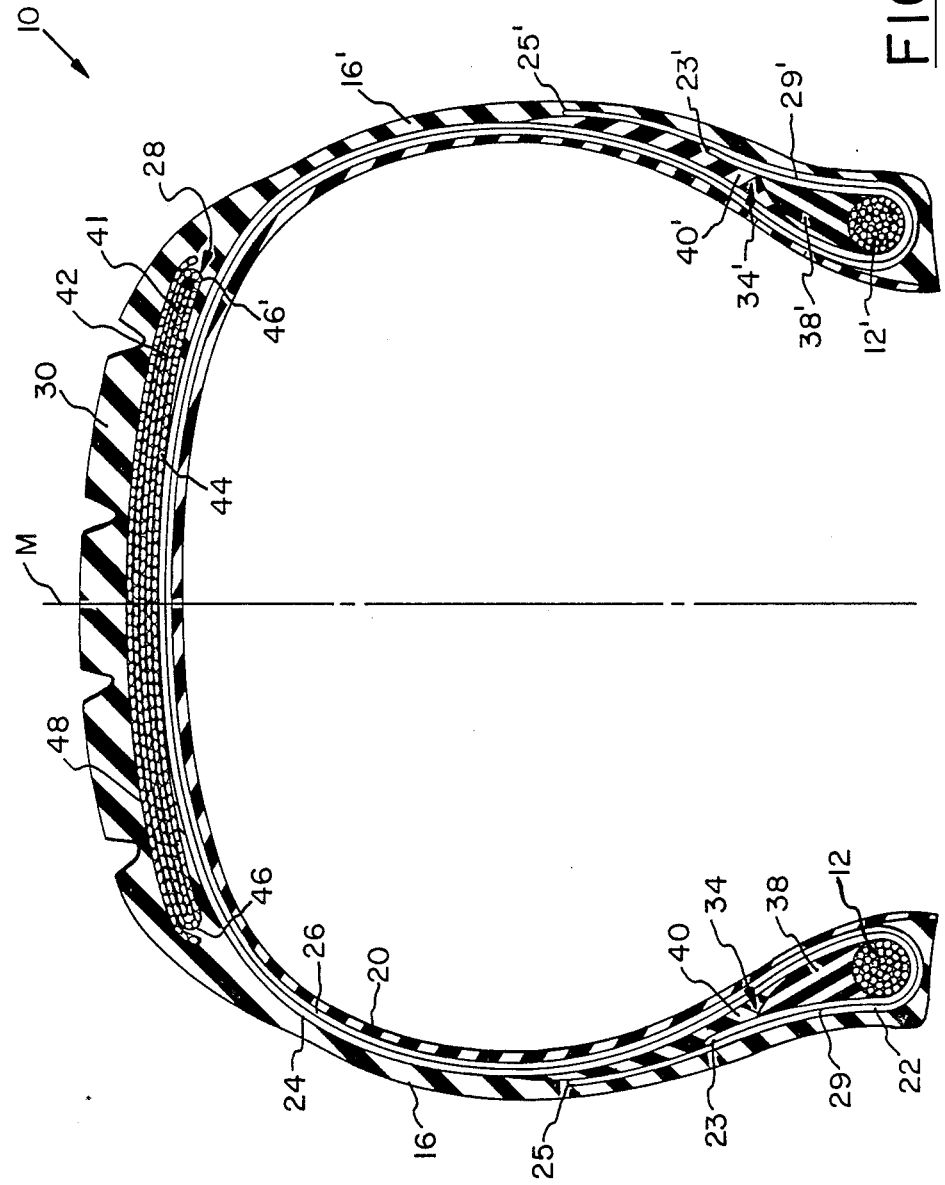
FIG. 1 is a radial cross-sectional view of a pneumatic aircraft tire constructed in accordance with the invention.

With reference to the drawings, wherein like numerals or letters refer to like parts and primed numerals designate symmetrically similar parts, there is shown a pneumatic aircraft tire 10 having a pair of substantially inextensible annular beads 12 and 12'. The beads 12 and 12' are spaced from one another along the axial direction of the tire. The axis of rotation of the tire is centered within the annular beads 12 and 12' and is perpendicular to the mid-circumferential plane M of the tire. The beads 12 and 12' usually are formed from steel wire in a bundle that may be of circular, oval, hexagonal or other cross-section. The axis of the tire is centered within the annular beads 12 and 12' and is perpendicular to the mid-circumferential plane M. In normal use, the tire 10 is mounted on a suitable rim, is inflated to suitable pressure, and rotates about its axis.

The pneumatic tire 10 has extending between the beads 12 and 12' a liner 20, a reinforcement ply 24, and a barrier ply 26. In addition, a circumferentially inextensible belt assembly 28 is positioned in the crown region 30 of the tire, which includes a grooved tread that joins the tire sidewalls 16 and 16'.

The liner 20 preferably has one surface which is precured before assembly in the tire 10 and is made from a halo-butyl material, which has the characteristic of low permeability to air, thus allowing little air loss through the liner when the tire is mounted and inflated on a rim. For clarity of illustration, the liner material in FIG. 1 is separately sectioned to show its location adjacent the barrier ply 26. Also, as used herein, the term "outer side" of a tire component refers to its side toward the outside of the tire. Thus, the barrier ply 26 is positioned on the outer side of the liner 20 and the reinforcement ply 24 is positioned on the outer sides of both the barrier ply 26 and the liner 20.

The reinforcement ply 24 includes parallel cords made from an aromatic polyamide material or parallel cables made from steel wire. Although cords or cables typically are made from a plurality of filaments twisted together, the cords or cables may be made from a single reinforcing element, such as a single steel wire, where such structure is adequate for the intended use of the pneumatic tire. The cords or cables of reinforcement ply 24 are embedded in an elastomeric material and the reinforcement ply has a plurality of cord or cable ends per centimeter. This means that the reinforcement ply, if cut in a direction perpendicular to the individual lengths of the parallel cords or cables, would display a plurality of cord or cable ends for each centimeter of the length of the cut in the reinforcement ply.

The reinforcement ply 24 has a ply tensile strength that is selected by the tire designer to satisfy the strength requirements for the tire carcass in its intended application. Ply tensile strengths for tire reinforcement materials (consisting of parallel cords or cables embedded in an elastomeric material) usually are expressed in units of force per unit of cross-sectional length perpendicular to the length of the stressed cords or cables. Ply tensile strengths are the product of the cord or cable tensile strengths multiplied by the cord or cable end count in the ply. For aromatic polyamide or steel materials used in pneumatic tires manufactured by the assignee of this invention, the ply tensile strengths range from about 3,300 newtons per cm to about 26,000 newtons per cm. These materials also vary in cord or cable end count from about 2.5 ends per cm (for large-diameter steel-cable plies) to 15 ends per cm (for smalldiameter aromatic-polyamide-cord plies).

The ply tensile strength is important because it pertains to the ultimate stress-handling and rupture resistance of a tire component. However, for purposes of the present invention, ply modulus of elasticity is of greater concern. Modulus of elasticity in general may be defined for a material as a ratio of stress to strain within the linear elastic range of such material. The strain is the change in length of the material, as a result of the stress, divided by its original length. As applied to a tire reinforcement cord or cable, the cord or cable modulus of elasticity is the ratio of its longitudinal stress to the resulting strain within the elastic limit of the cord material. A reinforcement ply of parallel cords or cables also has a modulus of elasticity; the ply modulus of elasticity is equal to the cord or cable modulus of elasticity multiplied by the cord or cable end count in the ply.

An important feature of the present invention is that the pneumatic tire 10 has one or more reinforcement plies 24 each having the same ply modulus of elasticity and that there is no other bead-to-bead ply having a greater ply modulus of elasticity. This allows the ply or plies 24 to provide the primary strength of the tire carcass, while the barrier ply 26, located between the ply or plies 24 and the liner 20, can provide its preferred functions, as described below, without adversely affecting tire characteristics.

The barrier ply 26 also includes parallel cords or cables embedded in an elastomeric material and this ply extends between the beads 12 and 12'. The barrier ply is positioned between the liner 20 and the reinforcement ply 24 to form a barrier between them and for other purposes more fully detailed below. The barrier ply 26 has a plurality of cord or cable ends per centimeter and has a ply modulus of elasticity, as defined above, that is substantially less than the ply modulus of elasticity of the reinforcement ply or plies 24. A preferred barrier ply 26 has a higher end count than the reinforcement ply 24 and contains cords made from a polyester material, but nylon, preferably produced by low-shrink processing, or rayon could be used. The ply modulus of elasticity for the barrier ply must be substantially less than the ply modulus of elasticity of the reinforcement ply 24 to provide a tire having the benefits of the invention. Since the ply modulus is equal to cord or cable modulus multiplied by the cord or cable end count in the ply, a difference in ply modulus of elasticity can be achieved by either varying the cord or cable material or the ply end count. For this reason, it may not be suitable for the barrier ply to contain aromatic polyamide cords or steel cables unless these cables are lesser in number or of reduced individual strength as compared to the corresponding cords or cables in the reinforcement ply. In general, it is preferred that the ply modulus of elasticity of the barrier ply 26 be between about one-fifth and one-tenth the ply modulus of elasticity of the reinforcement ply 24. Also, it is generally better to obtain this difference in ply modulus by changing cord or cable materials, twist characteristics, construction, or processing as opposed, for example, to changing ply cord or cable end count. Although there is some latitude for changes in end count, individual cords may become spaced too far apart or too close together for adequate stress distribution or adherence to the elastomer.

Figure 2:
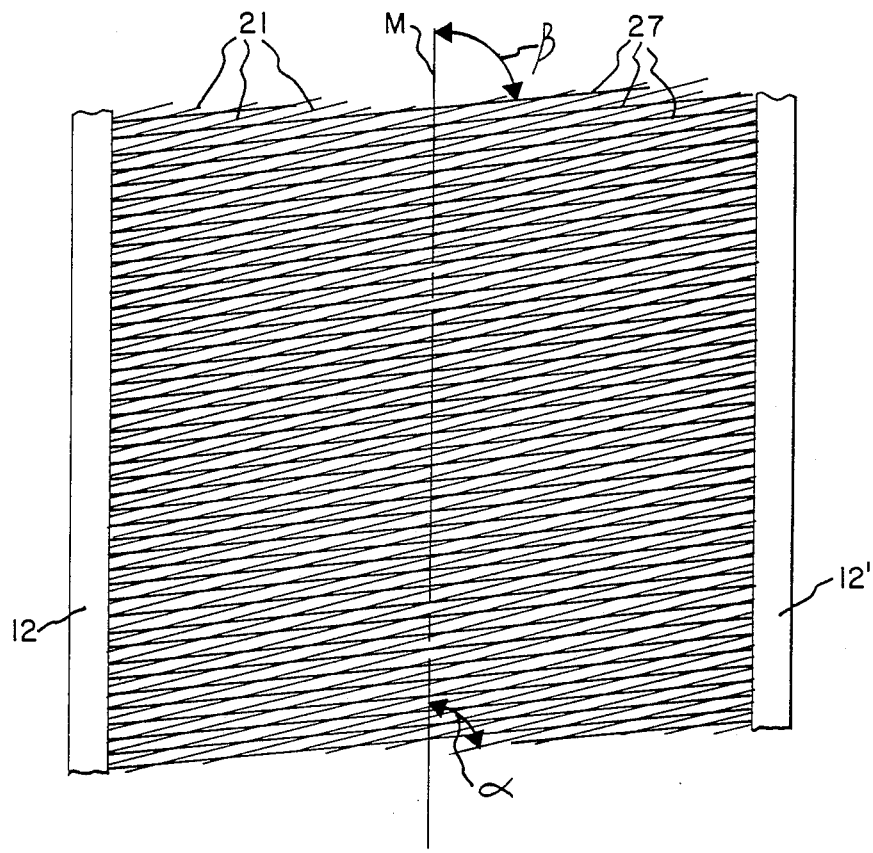
FIG. 2 is a schematic representation illustrating the preferred angular orientations of cords or cables in the reinforcement and barrier plies of the pneumatic tire of FIG. 1.

With reference now to FIG. 2, there is shown a schematic representation of the parallel cords or cables of the reinforcement ply 24 and the parallel cords or cables of the barrier ply 26. The view in FIG. 2 is a plan view in which the observer is above the tire looking down at the reinforcement and barrier plies which have been uncovered by removal of the tread, belt assembly 28, and the elastomeric material covering the cords for cables of the plies 24 and 26. The circumferentially-extending barrier ply 26 has a pair of axially-opposed edge portions 25 and 25', as may best be seen in FIG. 1. Each of the edge portions of the barrier ply is anchored around, or turned up around, one of the annular beads 12,12'. The cords or cables of the barrier ply intersect the mid-circumferential plane M of the tire 10 at an angle $\alpha$. The axially-opposed edge portions 23 and 23' of the reinforcement ply 24 also are anchored around the respective annular beads 12,12'. The cords or cables 27 of the reinforcement ply intersect the mid-circumferential plane of the tire 10 at an angle $\beta$. In the preferred form of the pneumatic tire 10, the angle $\beta$ is in the range from 80° to 90° (the illustrated pneumatic tire 10 thus has a radial reinforcement ply construction) and the angle $\alpha$ differs from the angle $\beta$ by an amount less than or equal to 20°. It is preferred feature of the invention that the cords or cables 27 of the reinforcement ply 24 extend from the annular bead 12 to the annular bead 12' in the same direction of bias as the cords or cables 21 of the barrier ply 26. In other words, the cords or cables of the reinforcement and barrier plies 24 and 26 are biased in the same direction.

In a preferred form of a pneumatic aircraft tire that utilizes aromatic polyamide cords in the reinforcement ply 24 at a bias angle of about 88° in one direction with respect to the mid-circumferential plane M of the tire, the barrier ply 26 had cords of polyester biased in the same direction at an angle of 8020 with respect to the mid-circumferential plane M of the tire. Of course, variations in the angles $\alpha$ and $\beta$ may be made, but such variations are limited by desired functional interaction between the barrier ply 26, the reinforcement ply 24, the liner 20 and beads 12 and 12'. The barrier ply 26 also interacts, in the preferred form of the invention, with the apex regions of the tire, that is, the regions of the tire 10 above the respective beads 12 and 12'.

The edges 23 and 23' of the reinforcement ply 24 are closer to the respective beads 12 and 12', around which they are wrapped, than are the edges 25 and 25' of the barrier ply 26. This "stepping" of the reinforcement and barrier ply edges helps to reduce, stress concentrations in the areas above the respective beads. The stepping also is a means for varying the stiffness of the tire sidewalls 16 and 16' in their lower regions extending down toward the respective beads. The apexes 34 and 34' of the pneumatic tire 10 also assist in this regard.

The apexes 34,34' of the tire also include means for varying the stiffness of its respective lower sidewall regions. The apex means for varying the stiffness of the lower sidewall regions of the tire is a variation of material compositions. Preferably, this variation in apex material compositions is attained through use of two annular strips 38,38' and 40,40' positioned above each of the respective beads 12,12' in a location at least partially confined between the main body of the reinforcement ply 24 and its respective end portions 29,29' wrapped around the beads 12,12'. The annular strips 38,38' are located on the radially-inner portion of the apex and are of an elastomeric compound that is hard relative to the elastomeric compound in the radially-outer annular strips 40,40'. Thus, the varying material composition of the apexes, together with the high edges 25,25' of the barrier ply 26 functioning much as a "chipper" in this regard, aids in the transition from the rather inflexible bead portions of the tire to its much more flexible mid and upper sidewall portions.

The barrier ply 26 is in juxtaposition to itself in the regions of the tire above each of the beads 12 and 12'. In this regard and as mentioned above, the barrier ply 26 functions much like the "chipper" found in prior art tire constructions. However, the barrier ply 26 has other functions as a result of its extension between the beads 12 and 12' to which it is anchored. The extension of the barrier ply 26 from bead-to-bead, with its cords or cables at an angle slightly different than the substantially-radially direction of the cords or cable in the reinforcement ply 24, allows the weaker of-the barrier ply 26 (which has a ply modulus that is substantially less than that of the ply 24) to reinforce the shoulder areas of the tire 10 during deflection. When the tire is under load, the shoulder regions (regions between the sidewalls 16,16' and the crown 30) deflect causing the radial cords or cables of the reinforcement to separate from one another so that the spaces the parallel cords or cables tend to increase. Because the cords or cables of the barrier ply 26 are oriented at a bias angle different than that of the cords or cables of the reinforcement ply 24, the former restrains the latter laterally and such tendency of the cords or cables to separate in the shoulder regions of the reinforcement ply 26 is reduced. Also, the difference in angle between the cords or cables of the reinforcement ply and the cords or cables of the barrier ply tends to prevent extrusion of the material of the liner 20 into the regions between the cords or cables of the reinforcement ply. This situation occurs particularly during the process of curing the tire in the course of its manufacture.

In contrast to the reinforcement fabric material described in aforementioned U.S. Pat. No. 3,165,138 to Manchetti et al, the barrier ply 26 is anchored at the bead as described above and extends from bead-to-bead with a cord or cable angle relative to the mid-circumferential plane M that preferably is less than about 20° different than the substantially radial cord or cable angle of the reinforcement ply 24. Currently, the cord or cable angle of the reinforcement ply 24 in the preferred aircraft tire is about 88°, as mentioned above. The slight difference of 2° from the true 90° radial orientation aids in reducing the tensile stress acting upon the cords or cables as a result of the tire curing process.

While the ply modulus of elasticity of the barrier ply 26 is substantially less than the ply modulus of elasticity of the reinforcement ply 24, it is possible that the barrier ply could adversely affect the tire operating characteristics by unduly stiffening its sidewall or by the introduction of circumferential strain. Although a difference in angle between the cords or cables of the reinforcement ply 24 and those of the barrier ply 26 is necessary, the difference in angle should be limited as necessary to prevent these undesirable conditions.

The circumferentially inextensible belt assembly 28 is located on the outer side of the reinforcement ply 24. The belt assembly preferably comprises at least two circumferentially-extending belts having parallel cord or cable reinforcing elements extending at oppositely-directed bias angles to the mid-circumferential plane M of the tire. The two belts 41 and 42 have cords or cables with cut ends located on opposite sides of the belt assembly. The belt assembly 28 also preferably includes at least one belt 44 having parallel cords or cables, the belt 44 being folded as indicated at 46 and 46' to enclose the cut ends of at least one of the aforementioned belts 41 and 42. The cords or cables in the folded belts preferably have an angle to the mid-circumferential plane M that is in the range of 15° to 35°. An overlay 48 of zero degree nylon cords in one or more layers may be included in the belt assembly 28 to increase its circumferential inextensibility and to improve the high-speed capability of the pneumatic tire 10.

Based upon the foregoing description of the invention, what is claimed is:

1. A pneumatic tire (10) comprising:
   (a) a pair of annular beads (12,12') spaced from one another along the axis of the tire;
   (b) a liner (20) extending between the tire beads;
   (c) a reinforcement ply (24) positioned on the outer side of the liner and including parallel cords made from an aromatic polyamide material or parallel cables made from steel wire, the cords or cables (27) being embedded in an elastomeric material and extending between the beads, the reinforcement ply having a plurality of cord or cable ends per centimeter and having a ply modulus of elasticity, the tire having no other bead-to-bead ply of parallel cords or cables having a greater ply modulus of elasticity, the cords or cables of the reinforcement ply forming an angle $\beta$ with the mid-circumferential plane (M) of the tire, the angle $\beta$ being in the range from 80° to 90°;
   (d) a barrier ply (26) including parallel cords or cables (21) embedded in an elastomeric material and extending between the beads, the barrier ply wrapping around the respective beads of the tire, thereby, to be anchored at such respective beads, the barrier ply being positioned between the liner and the reinforcement ply to form a barrier between them, the barrier ply having a plurality of cord or cable ends per centimeter and having a ply modulus of elasticity that is less than one-fifth the ply modulus of elasticity of the reinforcement ply, the cords or cables of the barrier ply forming an angle $\alpha$ with the mid-circumferential plane (M) of the tire, the angle $\alpha$ differing from the angle $\beta$ by an amount less than or equal to 20°;
   (e) a circumferentially inextensible belt assembly (28) positioned in the crown region of the tire.

2. A tire according to claim 1, wherein the cords or cables of the reinforcement ply and the cords or cables of the barrier ply are at bias angles in the same direction with respect to the mid-circumferential plane (M) of the tire.

3. A tire according to claims 1 or 2, wherein the tire further includes apex means (34,34') of varying material composition positioned adjacent each bead for varying the stiffness of the respective sidewall regions of the tire, the apex means of varying material composition being at least partially confined between the reinforcement ply (24) and its respective end portions (29,29'), the respective end portions being wrapped around the beads (12,12').

4. A tire according to claim 3, wherein the apex means comprises a radially inner elastomeric compound (38,38') and a radially outer elastomeric compound (40,40'), the former being relatively harder than the latter.

5. A tire according to claim 4, wherein the liner has a surface which is precured.

* * * * *